United States Patent [19]

Esseff et al.

[11] Patent Number: 5,411,032
[45] Date of Patent: May 2, 1995

[54] ELECTRONIC THERMOMETER PROBE COVER

[75] Inventors: George J. Esseff, Camarillo; Earl Steiker, Los Angeles, both of Calif.

[73] Assignee: Infra-Temp Inc., Camarillo, Calif.

[21] Appl. No.: 79,185

[22] Filed: Jun. 18, 1993

[51] Int. Cl.$^6$ .............................................. A61B 1/22
[52] U.S. Cl. ................................. 128/736; 128/664; 128/9; 374/121
[58] Field of Search ............... 128/9, 736, 664; 374/121, 123, 158, 208, 209

[56] References Cited

U.S. PATENT DOCUMENTS

| | | | |
|---|---|---|---|
| 3,878,836 | 4/1975 | Twentier | 128/9 |
| 3,987,899 | 10/1976 | Vyprachticky | 374/209 |
| 4,366,811 | 1/1983 | Riester | 128/9 |
| 4,662,360 | 5/1987 | O'Hara et al. | 374/158 X |
| 4,863,281 | 5/1989 | Suszynski | 374/209 X |
| 4,895,164 | 1/1990 | Wood . | |
| 5,088,834 | 2/1992 | Howe et al. | 128/664 X |
| 5,163,418 | 11/1992 | Fraden et al. | 128/664 X |
| 5,179,936 | 1/1993 | O'Hara et al. | 374/158 X |
| 5,188,459 | 2/1993 | Mino et al. | 374/209 X |

FOREIGN PATENT DOCUMENTS 8601992 4/1986 WIPO ..................... 128/9

Primary Examiner—Sam Rimell
Attorney, Agent, or Firm—Lyon & Lyon

[57] ABSTRACT

An improved probe cover and thermometer for tympanic temperature measurement include means to preclude the reuse of a probe cover. In the preferred embodiment, a cup-shaped probe cover includes two or more legs terminating in tabs or flanges. The tabs or flanges are sensed by switches. In the preferred embodiment, the switches are disposed within a recess, thereby precluding the circumvention of the switch function. In an alternative embodiment, a plurality of externally located switches are provided to mate with a plurality of flanges. Alternative, the extension from the probe cover may comprise a skirt terminating in a flange or tab. In operation, the thermometer may not be operated without the positive presence of a probe cover, as indicated by the presence of the tabs acting upon the recessed switch or a plurality of tabs acting upon the externally located switches. Ejection of the probe cover causes deformation of the probe cover to indicate prior use. The preferred modes of deformation include marking, such as with indelible ink, punching, cutting or bending. The tabs or flanges provide a positive locking force of the probe cover to the thermometer until ejection. The deformation of the probe cover upon ejection in combination with the one time temperature measurement ensures that a new probe cover will be utilized with the subsequent measurements.

8 Claims, 2 Drawing Sheets

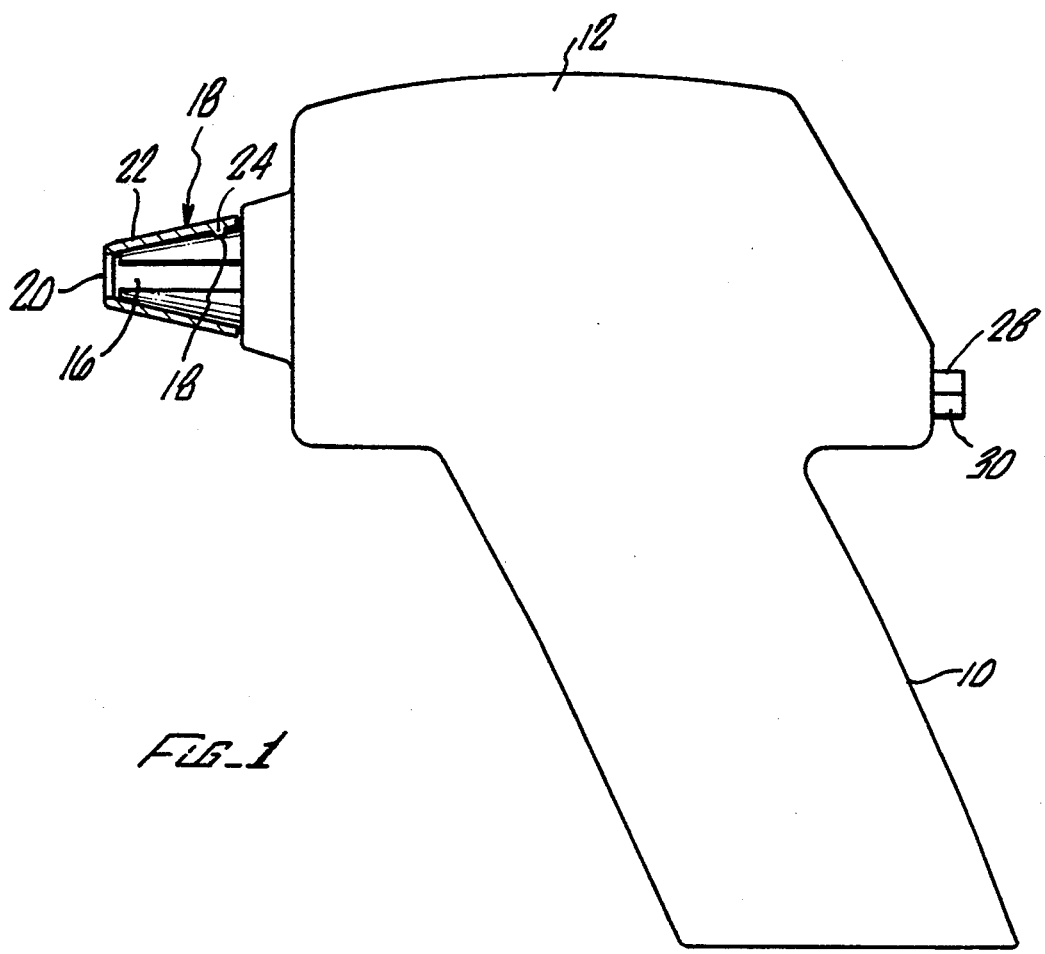
FIG_1
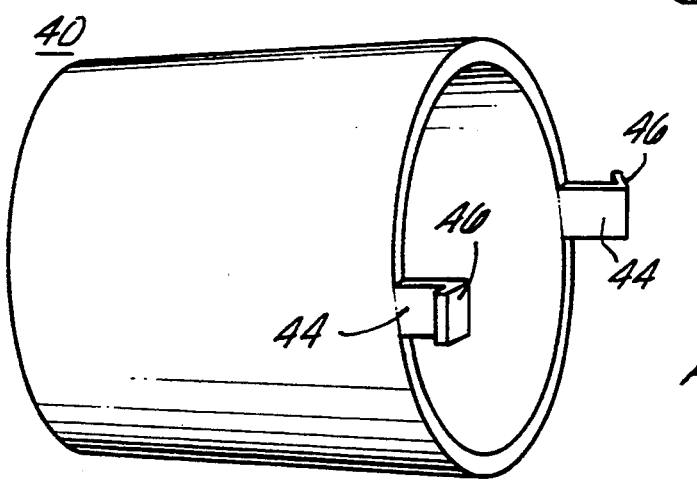
FIG_2
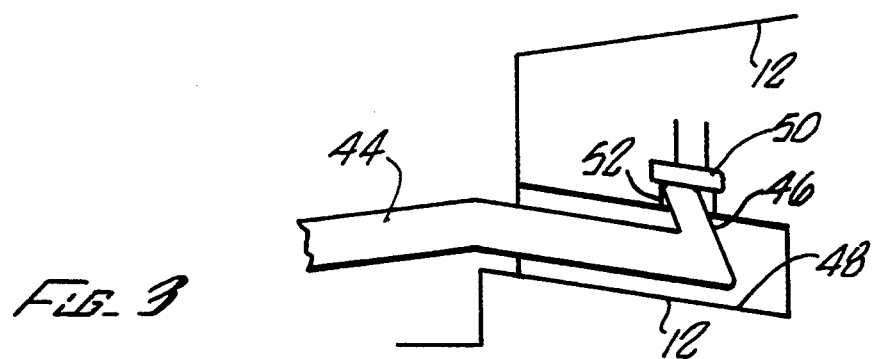
FIG_3

ELECTRONIC THERMOMETER PROBE COVER

FIELD OF THE INVENTION

This invention relates to the field of coverings for thermometers. More particularly, it relates to probe covers for use with electronic thermometers, especially thermometers which measure tympanic membrane temperature via the ear canal, as an accurate measurement of body core temperature.

BACKGROUND OF THE INVENTION

Various types of thermometers have been used to measure a patient's temperature. Conventional types of thermometers include glass thermometers containing mercury, electronic probe thermometers for oral temperature measurement and tympanic infrared thermometers. This invention is particularly suited for use with electronic thermometers, especially those which measure tympanic membrane temperature via the ear canal.

FIG. 1 shows a side view of a typical hand-held electronic thermometer for tympanic membrane temperature measurement. A handle 10 connects to a housing 12 which contains the electronics. For details of the structure and operation of a conventional thermometer see, e.g., Wood, U.S. Pat. No. 4,895,164. The forward portion of the housing 12 includes a tube 15 having an opening 16 through which infrared radiation may be passed to the detection electronics (not shown). A probe cover 18 may be disposed over the tube 14. Generally, the probe cover comprises a window 20 through which the infrared radiation from the tympanic membrane may pass, and a side 22 which generally surrounds the tube 14. The interior portion of the side 22 may include a protrusion 24 which meets with a groove 26 to provide a minimal amount of locking force of the probe cover 18 onto the tube 14.

In operation, the user of the thermometer holds the handle 10 to support the thermometer. The tube 14, along with the probe cover 18, is placed at the ear of the patient and inserted pressure into the ear canal. The user then presses a read button 28 which causes the reading of the patient's temperature which is displayed on a display (not shown). After operation, an eject button 30 may be depressed which causes the probe cover 18 to be ejected.

The main function of the probe cover 18 is to prevent the spread of infection. Generally, the infection would be a cross infection from one patient to the next, though it is possible to reinfect a given patient, such as from one ear to the other, or by later reinsertion in the same ear.

Probe covers have taken various forms in the past. One form consists of a generally flat, generally infrared transmissive material surrounded by a collar or a ring. The collar or ring is disposed around the tube 14. The opening 16 of the tube 14 is then pressed through the infrared transmissive material, thereby expanding the material. These probe covers have suffered from tearing problems. Another conventional probe cover is that as shown in FIG. 1, generally comprising a cup shape. The cup may be formed of a single piece or multiple piece as desired. Generally, the cup is held on the thermometer by a friction fit. Supplemental restraining force may be provided by means such as the protrusion 24 and the groove 26.

A main deficiency of prior art designs is that it is possible to reuse the prove cover, especially the cup shaped probe cover. Such a reuse may happen unintentionally when a medical health professional comes upon a thermometer with a probe cover already on it. If there is no visible evidence of prior use, it may be assumed that the probe cover has not been used, when in fact it has been used. Similarly, under the press of rapidly changing events as often occurs in a hospital, the medical health professional may forget whether the probe cover has been changed. Additionally, while it is clearly counter to good medical practice, in an attempt to save costs, the probe cover may at times be reused.

The reuse of the probe cover presents several clear problems in the prior art. As described above, the problem of infection is clearly present from reuse of a probe cover. Additionally, the thermometer is calibrated for use of a probe cover which is at ambient temperature. In the event a probe cover is immediately reused, it may have a temperature above ambient temperature, thereby resulting in an inaccurate measurement of the patient's temperature.

Another problem well known to the prior art is the possibility of use of a thermometer without a probe cover. This may be done in order to save time or money, or both. This provides an even more severe problem with regard to infection. Additionally, it provides accuracy and repeatability problems in that the thermometers are calibrated to account for attenuation via absorption by the probe cover of the infrared radiation from the patient. If no probe cover is used, the reading is inaccurate because the thermometer attempts to account for a structure which is in fact not there.

Certain prior art thermometers have attempted to solve these problems by providing an external switch activated by the probe cover. However, this has not solved the problems in that the switch is external and easily overridden by the user if desired. These thermometers may additionally require the rejection of the probe cover prior to reactivation. However, there is nothing in this design which guarantees that a new probe cover must be used. In certain instances, the user may simply affix the previously used probe cover to the thermometer.

Yet another problem existing in the prior art designs is that the probe cover may remain in the patient's ear canal after removal of the thermometer. Since the fit between the probe cover and the tube 14 is basically a friction fit, when the friction between the probe cover and the ear canal is greater than that between the probe cover and the tube 14, the probe cover may remain within the ear canal. This results in lost time in the overall measurement and possible discomfort to the patient.

Despite these long standing and serious problems, no satisfactory solution has been advanced heretofore.

SUMMARY OF THE INVENTION

A generally cup shaped probe cover includes extensions with interlocking tabs or flanges. The tabs activate one or more switches, thereby activating operation of the thermometer. The switches are located within a recess such that they are not easily accessible by the user from outside the thermometer. In this way, the switch may not be easily overridden by the user. Additionally, the thermometer will not operate without a probe cover in place. In an additional aspect of this invention, a probe cover is cut somehow identified as having been used. In the preferred embodiment, this occurs upon removal of the probe cover from the thermometer. In the most preferred embodiments, the probe cover is punctured, cut or marked, such as with indelible ink, bent, upon its removal, so that it physically cannot be reused or it is obviously damaged or marked.

In the most preferred embodiment, a cup shaped probe cover includes multiple legs, each of the legs terminating in a flange. The leg and flange are inserted within a recess in the housing of the thermometer. The flange makes contact with a switch which indicates the positive presence of a probe cover. Additionally, the flange provides a positive locking force with the lip within the housing to provide positive restraining force.

It is a principal object of this invention to provide a probe cover which may be used only one time.

It is yet a further object of this invention to provide a probe cover which is identified as used upon removal from the thermometer, or which is so cut or damages or deformed that it cannot be physically used again.

It is yet a further object of this invention to provide a thermometer which can be used only once without removal of the probe cover.

It is yet a further object of this invention to provide for a thermometer which cannot be used without a probe cover and which cannot be overridden to mimic the presence of a probe cover.

BRIEF DESCRIPTION OF THE DRAWINGS

FIG. 1 shows a side view of a prior art electronic thermometer for measuring tympanic membrane temperature.

FIG. 2 shows a perspective drawing of a probe cover.

FIG. 3 shows a cross-section of the improved probe cover in opposition to the switch and housing.

DETAILED DESCRIPTION OF THE INVENTION

Figure 4:
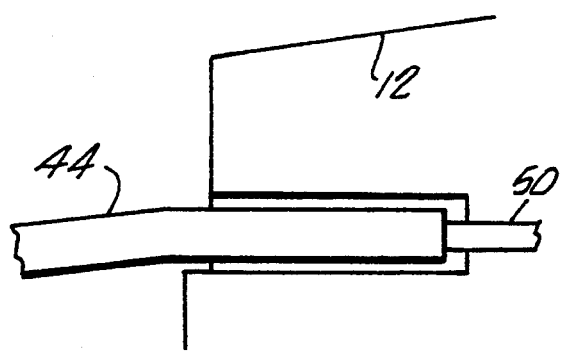
FIG. 4 shows a cross-section of the improved probe cover in opposition to a switch.

FIG. 2 shows a perspective view of one of the preferred embodiments of the invention. The probe cover 40 generally comprises a side portion 42 and an end window (not shown). As desired, the cup may be formed of a single piece or multiple piece design. If in a multiple piece, it is conventional that the window be separate and formed in combination with the side 42. One or more extensions 44 are formed integral with the probe cover 40. In the most preferred embodiment, the extensions comprise one or more legs 44. Each leg 44 preferably includes a flange or tab 46 at or near the end of the leg 44. The legs may be formed from the same material as is the remainder of the probe cover. The width may be selected as desired to provide sufficient rigidity and pliability.

FIG. 3 shows a cross-sectional view of one leg end inserted into the housing 12. In the preferred embodiment, the leg 44 and flange 46 are received by a recess 48 in the housing 12. The flange 46 may operate the switch 50 when inserted into the recess 48. In addition to actuation of the switch, the flange 46 may hook upon the lip 52 of the housing 12. In this way, a positive locking force may be provided holding the probe cover 40 in positive relationship to the housing 12 until ejection.

The switch 50 may be of any type adequate to perform the function of detection of the presence of a probe cover. In the preferred embodiment, a electromechanical switch is utilized. When the flange 46 is located in the recess 48 adjacent the switch 50, the switch 50 will be depressed and indicate the presence of the probe cover. When the probe cover is removed, the switch 50 returns to its nondepressed position, thereby indicating the absence of the probe cover. The switch may be formed of any type of sensor, such as an optical sensor as is known to those skilled in the art. Additionally, any form of electrical or magnetic sensor may be utilized, though they may require inclusion within the probe cover of metallic or ferromagnetic materials.

Figure 5:
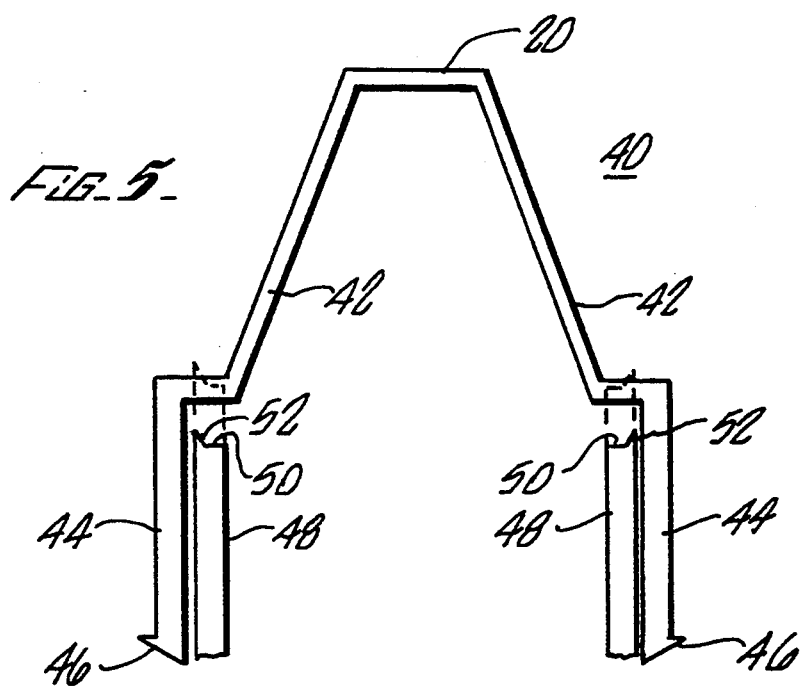
FIG. 5 shows a cross-sectional side view of the improved probe cover and an ejection mechanism.

FIG. 5 shows a cross-sectional view of the probe cover 40 plus ejection mechanisms. The probe cover 40 generally comprises a side portion 42 and a window portion 20. As shown, the extensions in the form of legs 44 terminate in flanges 46. As shown, an ejector 48 includes a upper face portion 50 and a piercer 52. In operation, the ejector is moved forward towards the probe cover 40 causing the piercer 52 to form a hole (not shown) in the probe cover 40. The forward position of the ejector 48 is shown in phantom. The face portion 50 provides force to remove the probe cover 40 from the thermometer. By adjusting the piercing force to be sufficient to pierce the probe cover 40 as an amount less than the force required to remove the flange 46, the prove cover 40 will be permanently deformed by this action.

Alternative methods for demarking the probe cover as used are available. For example, the probe cover may be marked with ink, preferably indelible ink. This may be marked upon removal of the prove cover. As yet another alternative, the probe cover may be bent during ejection. Preferably, the bending of the probe cover is such that the extensions, such as legs 44, will not mate and hold to the thermometer in an attempted second use. As yet another alternative, the probe cover 40 may be cut (as a variation of puncturing) so as to render the probe cover unusable. At a minimum, any of these methods would provide a visible indication of prior use of the probe cover 40, thereby indicating that it should not be used again.

Figure 6:
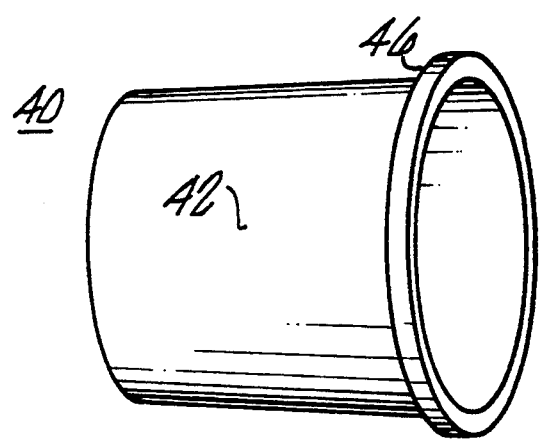
FIG. 6 shows a perspective drawing of a probe cover with a circumferential flange.

In an alternative embodiment for the probe cover, the extension may be comprised of a skirt. As shown in FIG. 6, the skirt may be integral with the side 42. Rather than separately formed legs 44, a continuous skirt terminating in a flange 46 may be utilized. The corresponding recess 48 in the housing 12 would preferably be essentially circular. This design has the advantage of not requiring the user to align legs 44 with a recess 48. Additionally, the probe covers 40 may be more easily stacked.

As will be appreciated by those skilled in the art, any number of legs 44 may be utilized. Additionally, certain of legs 44 may include flanges 46, and certain may not. For example, two legs may include flanges 46 and utilized for a locking and switch actuating function. As shown in FIG. 4, other legs may be utilized with or without the flange 46 to serve to align the probe cover with the thermometer housing 12. Alternatively, legs without flanges may work one or more switches. Advantageously, the legs without the switches may be made small in diameter, thereby decreasing the opportunity to override the system.

In operation, the thermometer will not operate without the presence of a probe cover 40. The switch 50 must be depressed before the temperature reading can be made. In this way, the use of a probe cover is assured. After a reading has been taken, the thermometer is disabled from reading until the probe cover is ejected. Once the probe cover is ejected, the thermometer is reset and operable once a replacement probe cover is provided. By use of the deforming feature of this invention, the old probe cover 40 will be marked such that it shows a visible indication of prior use, or in some cases rendered unusable. Accordingly, the thermometer will permit but a single use of a probe cover.

Though the invention has been described with respect to a specific preferred embodiment, many variations and modifications may become apparent to those skilled in the art. It is therefore that the appended claims be interpreted as broadly as possible in view of the prior art to include all such various and modifications.

We claim:

1. An electronic thermometer and probe cover combination for measuring a patient's temperature by infrared measurement through an ear canal comprising:
   a probe cover having extensions adapted to mate with a switch located in a recess in the thermometer,
   the recess in the thermometer being adapted to receive the portions of the probe cover bearing the extensions, and
   a switch within the recess to coact with said extensions to indicate the presence or absence of the probe cover.

2. The probe cover of claim 1 wherein the extensions are legs.

3. The probe cover of claim 1 wherein the extensions of the probe cover comprise a skirt.

4. The thermometer of claim 1 wherein the switch comprises an electromechanical switch.

5. The thermometer of claim 1 wherein the switch comprises an optical sensor.

6. In a thermometer for measuring infrared radiation via the ear canal as access to the tympanic member, a probe cover disposed on that portion of the thermometer which is disposed within the ear canal for temperature measurement, and an ejection member for dislodging the probe cover from the thermometer, the improvement comprising means for providing indelible ink onto the probe cover for identifying the probe cover as having been used after ejection.

7. A probe cover indicator for use in an electronic thermometer for measuring a patient's temperature by infrared measurement through an ear canal comprising:
   a probe cover having tabs adapted to mate with a switch,
   a recess adapted to receive the portions of the probe cover bearing the tabs, and
   an electromechanical switch adjacent to said recess to coact with said tabs to indicate the presence or absence of the probe cover.

8. A probe cover indicator for use in an electronic thermometer for measuring a patient's temperature by infrared measurement through an ear canal comprising:
   a probe cover having tabs adapted to mate with a switch,
   a recess adapted to receive the portions of the probe cover bearing the tabs, and
   an optical sensor switch adjacent to said recess to coact with said tabs to indicate the presence or absence of the probe cover.

* * * * *